United States Patent [19]
Boriani et al.

[11] Patent Number: 5,544,719
[45] Date of Patent: Aug. 13, 1996

[54] LIFT TRUCK FOR TRANSFERRING REELS TO A USER MACHINE

[75] Inventors: Silvano Boriani; Alessandro Minarelli, both of Bononia, Italy

[73] Assignee: G.D Societa' Per Azioni, Bolgna, Italy

[21] Appl. No.: 220,368

[22] Filed: Mar. 30, 1994

[30] Foreign Application Priority Data

Apr. 9, 1993 [IT] Italy ................. BO93A0139

[51] Int. Cl.⁶ ................................................. B66F 9/12
[52] U.S. Cl. ............................................ 187/237; 414/785
[58] Field of Search ........................... 187/9 R, 9 E, 187/8.41, 8.75, 237; 414/785, 458; 248/346, 671

[56] References Cited

U.S. PATENT DOCUMENTS

| 4,183,710 | 1/1980 | Burdick | 414/458 |
|---|---|---|---|
| 4,751,983 | 6/1988 | Leskovec et al. | 187/9 R |
| 5,097,166 | 2/1992 | Honegger | 414/458 |
| 5,207,297 | 5/1993 | Beattie et al. | 187/8.41 |

FOREIGN PATENT DOCUMENTS

| 319466 | 10/1988 | European Pat. Off. . |
| 402902 | 6/1990 | European Pat. Off. . |
| 658570 | 10/1951 | United Kingdom . |
| 2189469 | 3/1987 | United Kingdom . |
| 2267269 | 5/1993 | United Kingdom . |
| 8707573 | 12/1987 | WIPO . |

Primary Examiner—Kenneth Noland
Attorney, Agent, or Firm—Ladas & Parry

[57] ABSTRACT

A lift truck for transferring reels, and presenting a supporting platform adjustable in height; and a variable-capacity container for receiving at least one reel on edge, and connected to the supporting platform so as to travel between two limit positions in relation to the supporting platform and in a substantially horizontal direction parallel to the axis of the reel.

9 Claims, 4 Drawing Sheets

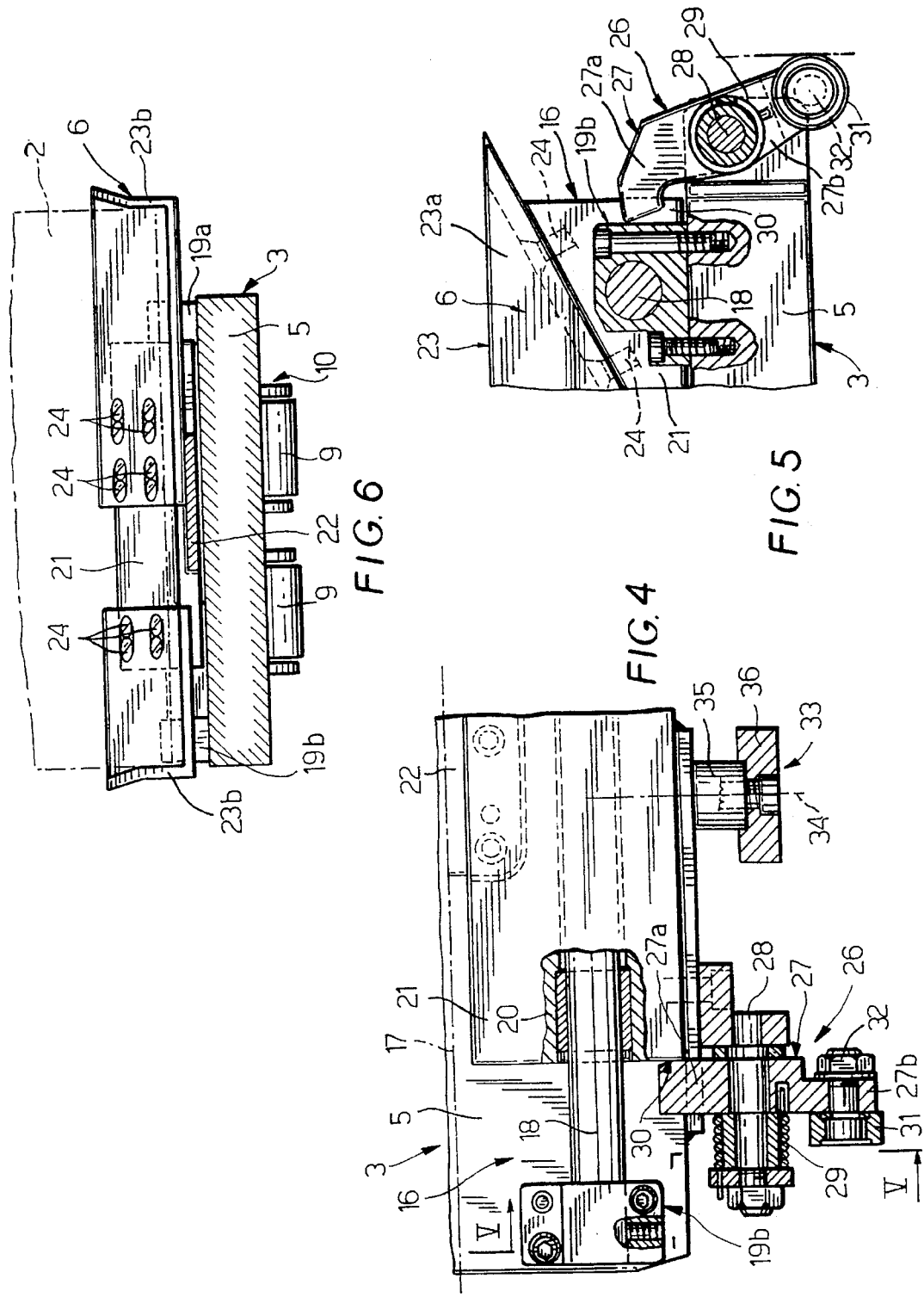

[5,544,719]

LIFT TRUCK FOR TRANSFERRING REELS TO A USER MACHINE

BACKGROUND OF THE INVENTION

The present invention relates to a lift truck for transferring reels to a user machine.

In particular, the present invention relates to a lift truck for transferring reels of strip material to a user machine comprising an unwinding unit, in turn comprising an unwinding head with a clamping member for positively engaging the core of the reel.

On known user machines of the aforementioned type, depending on the size and weight of the reels, these are normally fed to the machine and connected to the clamping member either manually by an operator, or by means of cumbersome, high-cost robot devices.

SUMMARY OF THE INVENTION

It is an object of the present invention to provide a lift truck enabling reels of any size and weight to be transferred safely by the operator on to a user machine, and which provides for troublefree connection of the reels to the unwinding head of the machine.

According to the present invention, there is provided a lift truck for transferring reels to a user machine; the truck comprising a supporting platform, and actuating means for vertically adjusting the position of the supporting platform in relation to the supporting surface of the truck; characterized by the fact that it also comprises container means for receiving at least one reel on edge; and guide means interposed between said supporting platform and said container means, for enabling the container means to travel, in relation to the supporting platform and in a given direction, between two limit positions.

BRIEF DESCRIPTION OF THE DRAWINGS

A non-limiting embodiment of the present invention will be described by way of example with reference to the accompanying drawings, in which:

FIG. 4 shows a section of a detail in FIG. 3;

FIG. 5 shows a section along line V—V in FIG. 4;

FIG. 6 shows a section along line VI—VI in FIG. 2.

DETAILED DESCRIPTION OF THE INVENTION

Figure 1:
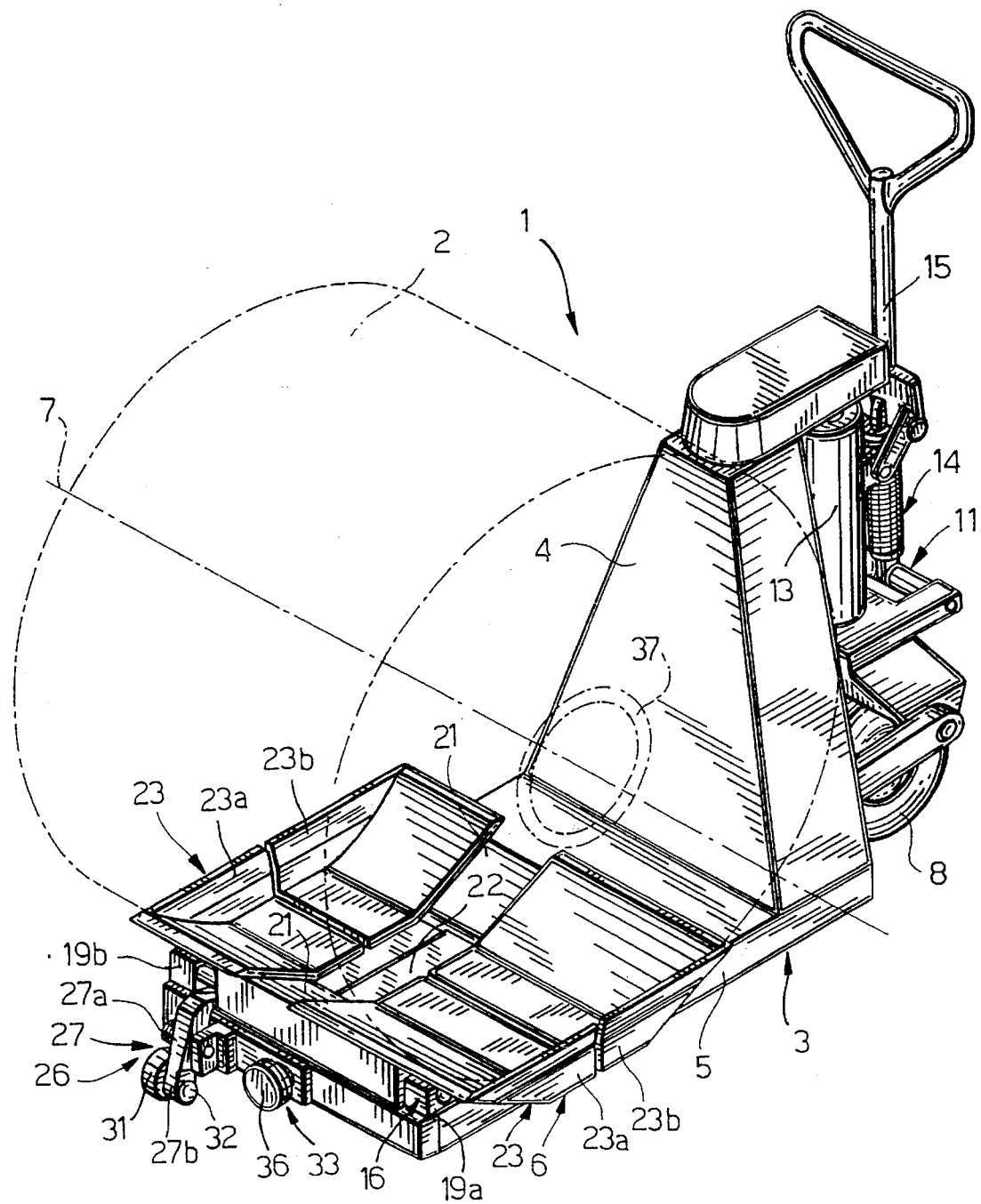
FIG. 1 shows a view in perspective of a preferred embodiment of the truck according to the present invention.
Figure 2:
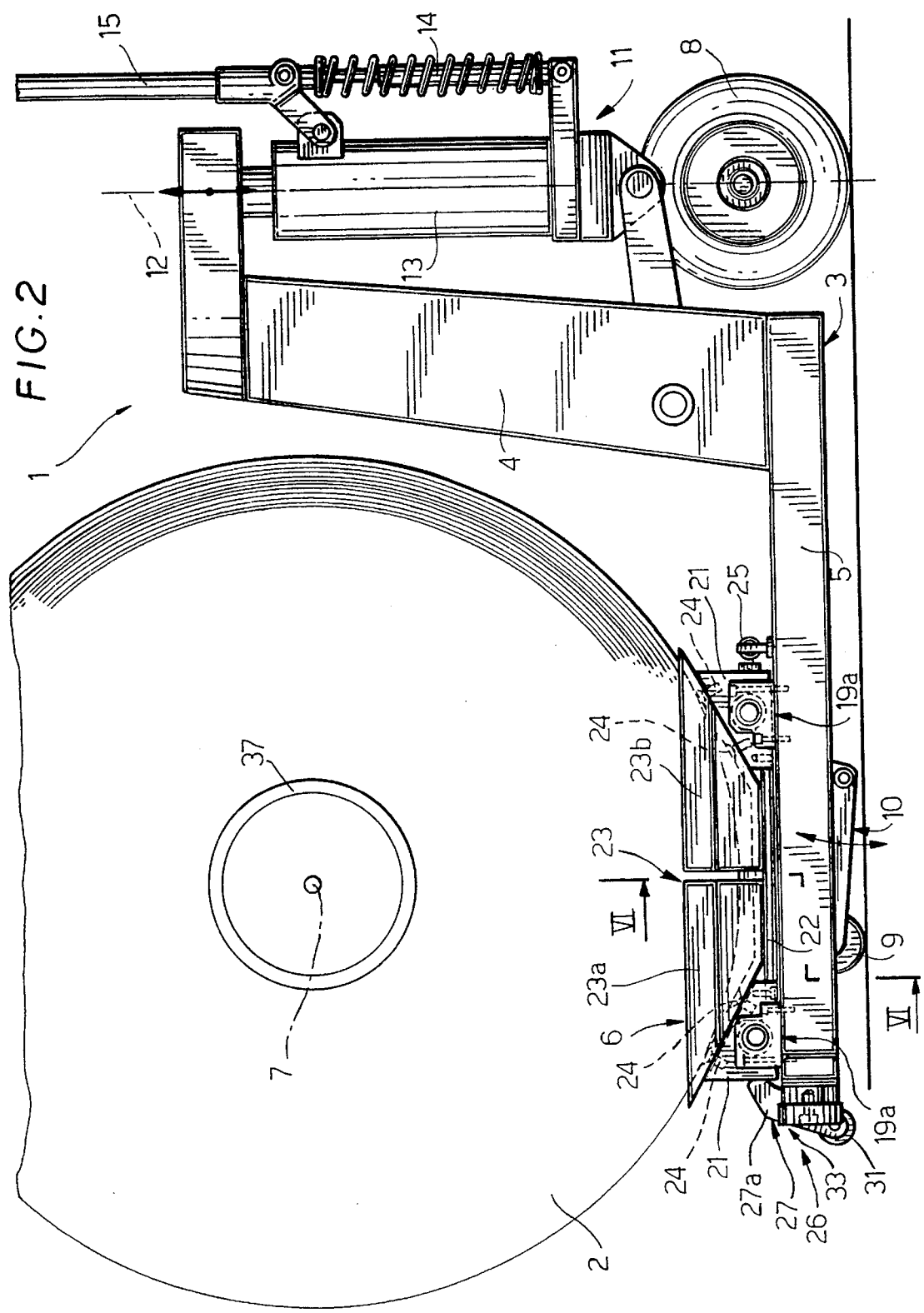
FIG. 2 shows a side view of the FIG. 1 truck.
Figure 3:
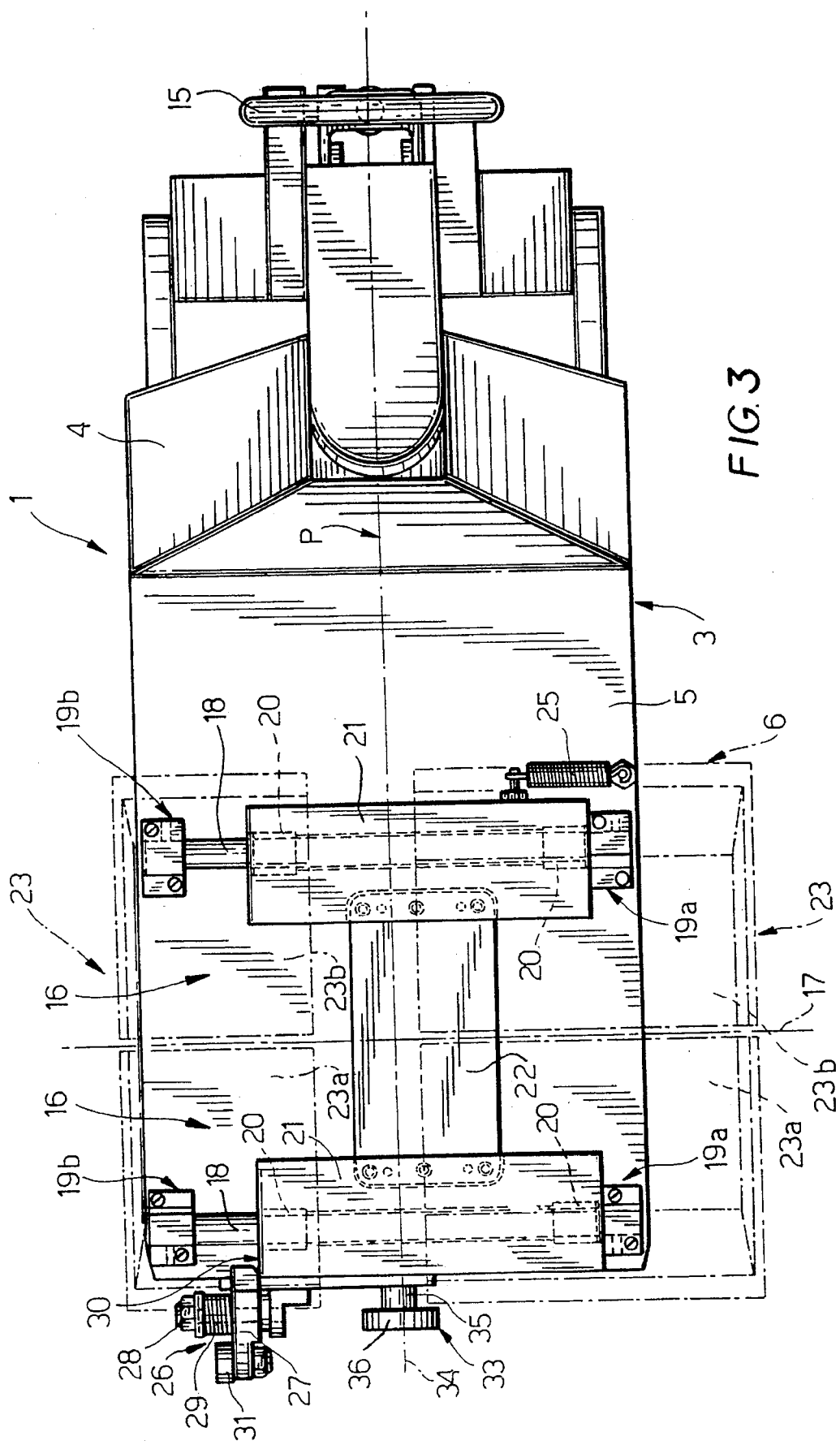
FIG. 3 shows a top plan view, with parts removed for clarity, of the FIG. 1 and 2 truck.

Number 1 in FIGS. 1 to 3 indicates a lift truck for transferring reels 2 of strip material to the loading station (not shown) of a user machine (not shown).

Truck 1 comprises a frame 3 having a longitudinal plane of symmetry P (FIG. 3) parallel to the FIG. 2 plane, and in turn comprising an upright 4, a substantially horizontal loading platform 5, and a tank type container 6 fitted to platform 5, for receiving and retaining reel 2 on edge with its axis 7 substantially perpendicular to plane P. Frame 3 is supported on a pair of side by side direction wheels 8 adjacent to upright 4, and which cooperate with a pair of balancing rollers 9 located beneath and connected to platform 5 by means of a known rocker arm drive 10. A known hydraulic lifting device 11 is provided between wheels 8 and frame 3, for enabling wheels 8 to rotate, in relation to frame 3, about a substantially vertical axis 12, and for enabling vertical adjustment of the position of frame 3 and hence platform 5 in relation to the floor beneath truck 1.

Device 11 comprises a hydraulic jack 13 interposed between wheels 8 and the top end of upright 4, and connected by a closed hydraulic circuit (not shown) to a fluid pump 14. Pump 14 is operated manually by means of a rod 15 fitted with a handgrip, hinged to the jacket of jack 13, and which, in addition to controlling pump 14, also enables wheels 8 to be rotated by the operator about axis 12.

Again with reference to FIGS. 1–3, container 6 is fitted to platform 5 by means of a guide-slide device 16, so as to travel, in relation to platform 5 and in direction 17 perpendicular to plane P, between two limit positions: an idle position as shown in FIG. 1 and by the dot-and-dash line in FIG. 3; and an operating position (not shown).

More specifically, and as shown in FIG. 3, device 16 comprises two cylindrical transverse guide rods 18 parallel to each other and to direction 17, defining a plane parallel to platform 5, and connected integral with platform 5 by means of respective end supports 19a and 19b. Rods 18 engage in axially-sliding manner respective bushes 20 fitted to respective slides 21 connected integral with each other by a longitudinal cross member 22 (FIGS. 1 and 6).

According to a variation not shown, rods 18 are replaced by a single guide connected to cross member 22.

Slides 21 support container 6 which is transversely adjustable in size. For this purpose, container 6 is divided into four parts in two planes respectively parallel and perpendicular to plane P, which four parts form two pairs 23a, 23b, each fitted integral with the same slide 21. The position of the parts in each pair 23a, 23b on respective slide 21 is adjustable in direction 17 by means of a number of screws 24 (FIG. 6) connecting the parts to respective slide 21, so as to vary the capacity of container 6 and, more specifically, adjust container 6 to the width of reels 2.

Each part 23a and corresponding part 23b form a half shell 23, the position of which in relation to the other half shell 23 is adjustable in direction 17. According to a variation not shown, each part 23a is integral with corresponding part 23b.

As shown in FIG. 3 and particularly in FIG. 4, when container 6 is set to said idle position, slides 21 are positioned contacting respective supports 19a, and are held in this position by a traction spring 25 connected at one end to platform 5 and at the other to one of slides 21. Container 6 is also locked in the idle position by means of a releasable lock device 26 fitted to the front surface of platform 5 facing away from upright 4, and comprising a rocker arm lock 27. Rocker arm 27 presents a first and second arm 27a, 27b extending on either side of a central pivot pin 28 integral with platform 5 and parallel to direction 17, and is loaded by a torsion spring 29, for normally maintaining arm 27a in contact with an end surface 30, on the opposite end to supports 19a, of one of slides 21. A roller 31 integral with arm 27b enables the operator or a fixed stop (not shown) to move rocker arm 27 from the lock position (FIG. 5) to a withdrawn position in which it permits slides 21 to move along rods 18 towards supports 19b and in opposition to the action of spring 25.

As shown particularly in FIG. 4, truck 1 also comprises a mushroom type bumper 33 constituting a locating element for truck 1 in relation to the user machine (not shown).

Buffer 33 extends adjacent to device 26 and coaxially with a horizontal axis 34 lying in plane P, and comprises a cylindrical shank 35 fitted integral with said front surface of platform 5; and a head 36 fitted integral with and wider than the diameter of shank 35.

In actual use, once reel 2 is placed inside container 6, truck 1 enables the operator to transfer reel 2 to the loading station (not shown) of the user machine (not shown), and there, by means of device 11, to vertically adjust the position of reel 2, so that axis 7 of the reel coincides with the axis of an engaging device (not shown) on the unwinding head (not shown) of the user machine. At this point, device 26 is released, and container 6 moved manually or mechanically along rods 18 in opposition to the action of spring 25, so as to engage said engaging device (not shown) inside the central core 37 of reel 2.

Truck 1 according to the present invention thus enables the reel-change operator to feed reels 2 safely to the user machine (not shown), and to connect them relatively easily to the unwinding head (not shown) with a minimum amount of effort, regardless of the weight and size of the reels.

What is claimed is:

1. A lift truck for transferring reels to a user machine; the truck comprising a vertically adjustable supporting platform; actuating means for vertically adjusting the position of the supporting platform in relation to a supporting surface of the truck; container means for receiving at least one reel on edge; guide means interposed between said supporting platform and said container means, for enabling the container means to travel, in relation to the supporting platform and in a given direction, between two limit positions; and elastic push means for pushing said container means into a first of said limit positions.

2. A truck as claimed in claim 1, wherein said guide means comprises at least one guide connected to said supporting platform and extending in said given direction; at least one slide being connected in sliding manner to the guide, and being connected to said container means.

3. A truck as claimed in claim 1, further comprising lock means for releasably locking said container means in relation to said supporting platform in said first limit position.

4. A truck as claimed in claim 2, wherein said container means comprises at least one pair of half shells facing each other; and connecting means for connecting said half shells to said slide in adjustable manner in said given direction.

5. A truck as claimed in claim 4, wherein said half shells are aligned in said given direction, and receive said reel with its axis parallel to said given direction.

6. A truck as claimed in claim 1, further comprising a mushroom type bumper integral with said platform and extending perpendicular to said given direction.

7. A truck as claimed in claim 1, further comprising lock means for releasably locking said container means in relation to said supporting platform in said first limit position.

8. A truck as claimed in claim 2, wherein said container means comprises at least one pair of half shells facing each other; and connecting means for connecting said half shells to said slide in adjustable manner in said given direction.

9. A truck as claimed in claim 8, wherein said half shells are aligned in said given direction, and receive said reel with its axis parallel to said given direction.

* * * * *